E. BOESCH.

Street Lamp.

No. 9,556. Reissued Feb. 8, 1881.

Witnesses

Fred. G. Dieterich

A. H. Krause

Inventor

Emil Boesch for Bonney & Osborn

Attorneys.

N. PETERS, PHOTO-LITHOGRAPHER, WASHINGTON, D. C.

UNITED STATES PATENT OFFICE.

EMIL BOESCH, OF SAN FRANCISCO, CALIFORNIA.

STREET-LAMP.

SPECIFICATION forming part of Reissued Letters Patent No. 9,556, dated February 8, 1881.

Original No. 106,990, dated September 6, 1870; Reissue No. 8,993, dated December 9, 1879. Application for reissue filed August 23, 1880.

*To all whom it may concern:*

Be it known that I, EMIL BOESCH, of the city and county of San Francisco, State of California, have invented an Improved Lamp; and I do hereby declare that the following is a full, clear, and exact description thereof, reference being had to the drawings accompanying this specification and forming a part of the same.

My invention relates more particularly to outside lamps; and its object is to so construct the lamp as to obtain an increased volume of light from the same burners now in use. This is effected by the application of improved reflectors, which are adapted to be adjusted so that the light can be given a greater or less range, as desired, and be thrown out in every direction equally. The draft is also provided for in an improved manner, so that the efficiency of the light is also increased thereby.

My invention further relates to an improved method of retaining the glass sides of the lamp in place, so that they can be readily removed when it is desired either to clean or renew them.

In order to more fully illustrate and explain my invention, reference is had to the accompanying drawings, forming a part of this specification, in which—

Figure 1:
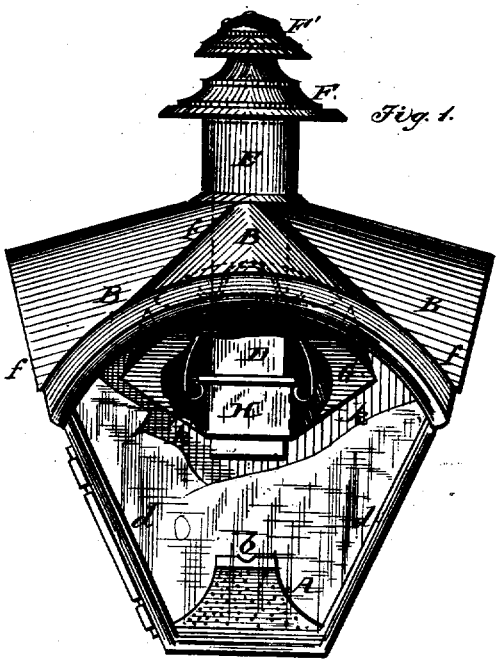
Figure 2:
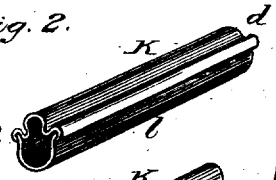
Figure 2A:
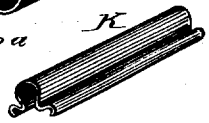
Figure 3:
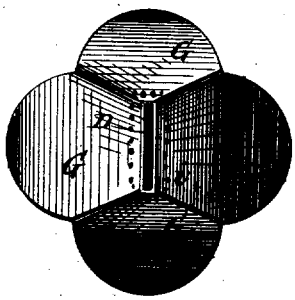
Figure 5:
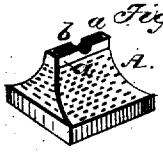
Figure 4:
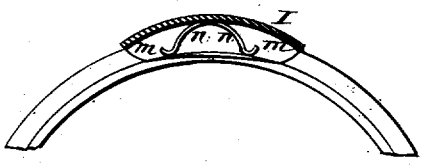

Figure 1 is a side elevation of my lamp. Figs. 2 and 2[a] are views of a portion of one of the corner-posts, showing their construction. Fig. 3 is a bottom view of the upper reflector. Fig. 4 shows the device for holding the glass in place. Fig. 5 is a view of the perforated reflector.

The general form of my lamp is similar to those ordinarily used.

The bottom of the lamp is left open, and a perforated reflector, A, is placed inside the lamp, so that it shall rest upon the lower rim of the lamp. This reflector is formed with four sloping sides, two of which are united at the top, so as to form a ridge similar to that formed by a hip-roof in architecture. A long narrow slot, *a*, is left between these two sides, through which the burner can be lighted from below. This slot also furnishes air directly to the flame, and aids to increase the light, at the same time causing it to burn steadily. A small hole, *b*, is made at the middle of the slot *a*, into which the upper end of the burner enters. The perforations in the reflector allow a sufficient amount of the light to pass downward immediately around the lamp-post, and also serve to provide fresh air to the flame.

The four standards *d* of the lamp-frame are formed of two pieces of sheet metal, K *l*, bent and united as shown at Fig. 2. The piece *l* is semicircular in form, while the piece or strip K connects its edges. The strip K has two longitudinal grooves or channels formed in it, one near each edge, in which the edges of the adjoining pieces of glass are held. This peculiar manner of making the standards provides both the body of the standard and the side channels necessary for holding the glass sides in place.

The roof B is formed over the top of each glass side with an arch which gradually rises and tapers toward the center, leaving channels *f* at the junction-line of each two of the arches, the roof being thus formed wholly of the arches, extending entirely back or up to the central smoke exit, E. This construction permits of the more effectual and uniform draining of the water into the gutters between the arches. An outside chimney or protector, E, which is circular in form, is then placed over the chimney D and secured to the ridges of the circular roofs. The upper end of this outer chimney is provided with cowls F F′, which protect the draft and prevent dust and water from passing into the lamp.

The channels *f* are directly above the corner posts or standards *d*, so that they form gutters to carry off the rain from the roof and keep it from running down the glass. This style of roof, while giving the lamp a handsome appearance, increases the area of the side openings and admits of the employment of upper reflectors, G, with as many curved faces as there are sides to the lamp. This reflector is made of one sheet of metal. An opening is left in its center to carry off the smoke and heat, and when adapted to slide, a long flange, H, is formed on its inner side, of a shape corresponding to the chimney D, and is held by flat springs *k k*, which are secured to the chimney, near the roof, and bear against it. The flange H slides under these springs, and is held by them at whatever height it is desired to regulate it.

The glass sides of the lamp, as above stated, are retained in the channels formed in the standards *d*. In order to keep them steady and prevent their being displaced by a jar or other accident, a small curved sheet-metal box, I, is secured to the lamp, immediately over the center of each arch, in which the glass is to be placed. A slot, *m*, extends the entire length of the box, in a position convenient to permit the upper edge of the glass to be slipped into it. A spring, *n*, is placed inside this box, being bent so as to spring both against the upper and lower sides of the box. The upper edge of the glass is first inserted in the slot in the box by compressing the spring, when it can be readily placed in the grooves prepared for it, the spring holding it firmly in place.

This manner of constructing lamps will readily recommend itself to persons familiar with their requirements.

Besides the advantages above enumerated, the lighting and extinguishing of the lamp, when gas is used, will be more readily accomplished than with those ordinarily used. This will be apparent when it is seen that the cock which lets the gas on is below the lamp and altogether outside of it, and after it has been turned, by simply placing a lighted match or other flame inside the perforated reflector A the gas will be lighted.

By adjusting the upper reflector the desired distance from the lower reflector, or by varying the angle of inclination of the upper reflector at the time said lamp is being built, the light can be given a greater or less range, as desired, and will be thrown out in every direction equally, while the provisions made for ventilation will prevent any part from being heated, or the flame from wavering or burning badly for want of fresh air.

Having thus described my invention, what I claim, and desire to secure by Letters Patent, is—

1. In a lamp, the combination of the lower pyramidal-shaped reflector, with concaved perforated sides, with the upper reflector, G, placed above the lower reflector, substantially as and for the purpose set forth.

2. The pyramidal-shaped reflector A, having the perforated concave sides, substantially as and for the purpose set forth.

3. The adjustable reflector G, having as many concave faces as there are sides to the lamp, and provided with the flange or sleeve H, in combination with the springs K, substantially as and for the purpose above described.

4. A lamp having as many arched tapering sides B to its roof as there are sides to the lamp, in combination with a reflector, G, which is provided with a corresponding number of faces, substantially as above specified.

5. In a lantern or lamp, the roof B, consisting of a number of arches arranged over the glass sides of the lantern, and each gradually rising and tapering back or up to the chimney, and separated by gutters *f*, as and for the purpose specified.

6. A lamp having each side made of a single pane of glass, the top edge of which is curved to correspond with and fit the concave roof B, substantially as described.

7. The box I, provided with the slot *m* and spring *n*, in combination with the glass frame of the lamp, substantially as and for the purpose above described.

8. In a lamp, the sheet-metal corner post or standard K *l*, provided with grooves *d*, to receive and hold the glass panes without any other fastening, substantially as specified.

9. The above-described street-lamp, in which are combined the reflectors A G, chimney E, roof B B, with its channels *f f*, and a cowl or cowls, all combined and arranged substantially as specified.

In witness whereof I have hereunto set my hand and seal.

EMIL BOESCH. [L. S.]

Witnesses:

EDWARD E. OSBORN,
WM. F. CLARK.